No. 729,993. PATENTED JUNE 2, 1903.
N. BARUCH.
BUREAU TRUNK.
APPLICATION FILED OCT. 18, 1902.
NO MODEL.
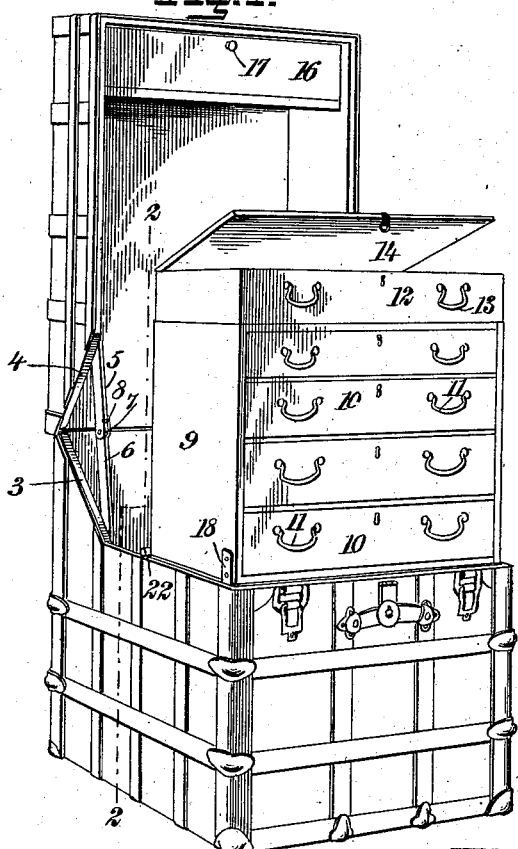
WITNESSES:
INVENTOR
Nathan Baruch
BY
ATTORNEYS.

No. 729,993.

Patented June 2, 1903.

UNITED STATES PATENT OFFICE.

NATHAN BARUCH, OF NEW YORK, N. Y.

BUREAU-TRUNK.

SPECIFICATION forming part of Letters Patent No. 729,993, dated June 2, 1903.

Application filed October 18, 1902. Serial No. 127,776. (No model.)

*To all whom it may concern:*

Be it known that I, NATHAN BARUCH, a citizen of the United States, and a resident of the city of New York, borough of Manhattan, in the county of New York and State of New York, have invented a new and Improved Bureau-Trunk, of which the following is a full, clear, and exact description.

My invention relates to bureau-trunks, my more particular object being to produce a trunk which is practically convertible into a bureau and suitable for use more particularly by traveling men, such as drummers, actors, clergymen, &c.

I will describe a bureau-trunk embodying my invention and then point out the novel features in the appended claims.

Reference is to be had to the accompanying drawings, forming a part of this specification, in which similar characters of reference indicate corresponding parts in all the figures.

Figure 1 is a perspective view of my improved trunk open and in use. Fig. 2 is a vertical section upon the line 2 2 of Fig. 1, and Fig. 3 is a central longitudinal section showing the trunk as closed and ready for shipment.

A box-like portion 1 is provided with a lid or top 2, which may be of the usual construction, or it may be provided with bevels 3 4, substantially as described in my other application, Serial No. 121,199, filed August 27, 1902. The body and lid portions may be connected together by means of brace members 5 6, these members being provided with pivots 7 and the member 6 being provided with a boss 8, all for the purpose of maintaining the lid in the position indicated in Fig. 1.

A bureau portion 9 is provided with removable drawers 10, these drawers having handles 11 for convenience. The removable tray 12 is provided with handles 13 and with a flat lid 14, the same preferably having the form of a mirror and serving as a looking-glass when the lid is open. Pivots 15 may be provided in the position indicated in Fig. 3 for the purpose of supporting the hat-box 16. This hat-box may be provided with a handle 17, whereby it may be readily opened.

A pair of side plates 18 engage the pintles 19, which are rigidly secured within the box-like portion 1. Brackets 20 are mounted upon the rear or bottom wall of the bureau portion 9. Bolts 21 are free to slide within these brackets and to engage the upper walls of the box-like portion 1, as indicated in Figs. 1 and 2, for the purpose of supporting the bureau portion when the same is ready for use. The bolts 21 have lugs 22 at their inner ends which limit the extent of their outward movement.

When it is desired to place the trunk in condition for shipment, the bolts 21 are drawn inwardly, the tray 12 is removed, the bureau portion 9 is swung downwardly into the position indicated in Fig. 3, the tray 12 is lowered edgewise into the space shown as occupied by it in Fig. 3, and the lid of the trunk, carrying with it the hat-box 16, is lowered into the position indicated in Fig. 3, the bevel-surfaces 3 and 4 meeting each other. The portion of the lid adjacent to the hat-box 16 may be used as a wardrobe, as described in my other application above mentioned.

It will be noted that the side plates 18 are so shaped and so disposed that when the bureau portion is swung downwardly into the body of the trunk a space is produced between the bureau portion and the end wall of the body portion. This space is exactly filled by the tray 12. When, however, the bureau portion is swung upward into the position indicated in Figs. 1 and 2, the face of the bureau portion comes flush with the end of the trunk, so that the drawers of the bureau are close at hand and readily accessible to a person standing adjacent to the foot of the trunk. In other words, the space necessary for the tray 12 does not necessitate the bureau portion 9 being placed so far back that a person would have to reach a considerable distance in order to engage the handles of the bureau-drawers. Upon the tray 12 being opened the mirror 14 is in proper position to serve as a looking-glass, as above explained. Of course the bureau portion may be used in connection with any desired type of trunk.

Having thus described my invention, I claim as new and desire to secure by Letters Patent—

1. A bureau-trunk, comprising a box-like portion, a bureau portion free to fit into the same, side plates mounted rigidly upon said bureau portion and projecting therefrom, said side plates being provided with pintle-holes spaced asunder from said bureau portion, pintles mounted within said box-like portion and engaging said pintle-holes, and latch mechanism for temporarily maintaining said portions in a predetermined relative position.

2. A bureau-trunk, comprising a box-like portion provided with side and end walls, a bureau portion free to fit into said box-like portion, side plates mounted upon said bureau portion and projecting a little distance therefrom, said side plates being provided with pintle-holes, pintles mounted in said side walls and disposed adjacent to one of said end walls but spaced therefrom, said pintles engaging said pintle-holes, the arrangement being such that said bureau portion is free to swing into and out of said box-like portion, and a separate receptacle movably occupying the space between said bureau portion and said end wall.

3. A bureau-trunk, comprising a box-like portion, a bureau portion pivotally mounted thereon, and a detachable receptacle engaging said box-like portion and said bureau portion, said receptacle serving to lock said bureau portion in position relatively to said box-like portion.

4. A bureau-trunk, comprising a box-like portion provided with side and end walls, a bureau portion free to fit into said box-like portion, longitudinal side walls mounted upon said bureau portion and extending a little distance therefrom, said side plates being provided with pintle-holes, pintles mounted upon said walls and disposed adjacent to one of said end walls but spaced therefrom, said pintles engaging pintle-holes, the arrangement being such that said bureau portion may be swung into and out of said box-like portion, and when swung said box-like portion is spaced asunder from the end wall thereof immediately adjacent, and a separate receptacle removably filling the space thus formed.

5. A bureau-trunk, comprising a box-like portion provided with side and end walls, a bureau portion free to fit into the same, and a pivotal connection engaging said side walls at a point a little removed from one of said end walls and also engaging said bureau portion, the arrangement being such that said bureau portion may be swung substantially to a right angle relatively to its normal position within said box-like portion, and when so swung may present a surface substantially flush with said end wall.

In testimony whereof I have signed my name to this specification in the presence of two subscribing witnesses.

NATHAN BARUCH.

Witnesses:
WALTON HARRISON,
F. W. HANAFORD.